United States Patent Office 3,028,250
Patented Apr. 3, 1962

3,028,250
COMPOSITE ZINC PIGMENTS
Edward J. Dunn, Jr., Port Washington, N.Y., assignor to National Lead Company, New York, N.Y., a corporation of New Jersey
No Drawing. Filed Jan. 14, 1958, Ser. No. 708,757
4 Claims. (Cl. 106—296)

This invention relates to pigments and more particularly to novel zinc coated silica cored pigments.

Zinc oxide has long been utilized as a major raw material by the paint industry. This is attributed to zinc oxide's variety of uses, such as for example, drying agent in fast-drying paints and enamels, gloss promoter and gloss retainer, color and tint retainer, etc., in numerous paint formulations. Zinc oxide's ability to neutralize acids and acid decomposition products in the binder of the paint film, which thereby substantially increases the paints' durability and color retention, has also long been known. Zinc oxide has also been used by the paint industry associated with other pigments such as lead to form a leaded zinc oxide pigment. However, the relatively high material cost of these zinc oxide pigments has always been a limiting factor in the full commercial exploitation of these pigments. Studies over the years have revealed that only the surface of the active pigment particle is involved in these neutralizing reactions and that only a minute part of the particles' surface is actually consumed by these reactions. In effect therefore an excess of active zinc oxide pigment has heretofore been employed by paint formulators. This disadvantage is not only limited to pure zinc oxide pigment but also applies to composite zinc oxide pigments such as leaded zinc oxides.

Finely ground silica has been used primarily as an extender or filler in paints and wood fillers but on a limited scale. This is due to the chemical inertness of silica, its low refractive index which results in a low hiding pigment and its abrasive nature and consequent hazard to health.

The principal object of this invention is to provide novel zinc oxide pigments which will retain the excellent reactive properties of zinc oxide pigments and which can be economically produced. Other objects and advantages will become apparent from the following more complete description and claims.

Broadly, this invention contemplates a composite zinc oxide-silica pigment comprising ZnO and SiO$_2$ in physico-chemical combination.

In a particularly desirable embodiment, this invention contemplates a composite zinc oxide-silica pigment comprising ZnO and SiO$_2$ in physico-chemical combination said ZnO and SiO$_2$ being present in proportion by weight of about 20%–80% to 80% to 20%.

This novel pigment of this invention may be prepared by forming a preliminary intimate mixture containing zinc oxide and silica. Subsequently the mixture is calcined which results in the chemical and physical combination of the ingredients to form a zinc oxide pigment containing free silica in which the silica is present without impairment to the characteristic surface properties of zinc oxide. As a source of silica, precipitated silicic acid or free native silica may be employed. It has been found, for instance, that quartzite which is readily obtainable in powder form is quite satisfactory when ground to sufficient fineness in a suitable mill such as a pebble mill. While the methods of mixing the ingredients may vary broadly it has been established that an intimate mixture is best obtained when the ingredients, unground silica and zinc oxide are ball milled with water as a one step operation. At the conclusion of the mixing operation the slurry is dewatered by filtering and drying. This may be accomplished by any of the standard methods employed, or the slurry may be transferred directly to a continuous rotary kiln in which the initial portion of the kiln will act as a drier and the subsequent portion as a calciner. The dried slurry is calcined at temperatures from about 450° C. to about 700° C. and preferably from about 550° C. to 650° C. The temperature of calcination is important since temperatures below 450° C. are generally ineffective. Temperatures above 700° C. complete a reaction speedily but often produce a partially sintered product gritty in character. The calcination time should generally be between 1 and 3 hours, preferably about 2 hours. The effective proportions by weight of the ingredients used in the practice of the invention are 20%–80% of ZnO to 80%–20% SiO$_2$. Pigments in which the ingredients are present in broader ranges than those given above can be successfully made. It has been determined however, that in these coated pigments effective pigmentary properties are substantially reduced.

If it is desired to incorporate other ingredients, for example lead oxide to form a composite leaded zinc, silica pigment according to this invention, it can be readily accomplished with few modifications of the above described process. The best results have been obtained when the lead, which may be in the form of a large variety of oxidic compounds of lead but for reasons of convenience and economy is preferably litharge, is preblended in the dry state with zinc oxide. The mixture is then rendered into a water slurry, screened and is added to a reaction tank containing the ground silica. At this point it is preferable, although not necessary, to add a small amount of acetic acid or some other acid catalyst for the purpose of dissolving a small portion of the litharge, thus supplying a greater concentration of lead ions to the solution. To this vigorously agitated slurry, sulfuric acid is slowly added forming 3PbO·PbSO$_4$ which during calcination breaks down to form PbO·PbSO$_4$ and PbO·PbSiO$_3$ Similarly to the preceding process the slurry is subsequently filtered, dried and calcined. During the calcination step residual moisture is driven off and the components of the pigment become united in a physico-chemical combination. The exact nature of the physico-chemical bond is not fully established; it appears to be both chemical and physical in nature. The components behave in paint formulations as if they consisted of one homogeneous substance, no evidence of segregation or the like being observable. When the lead is incorporated into the coated pigment, as is explained in the above example, the relative effective proportions of the silica and the leaded zinc oxide are 20%–80% to 80%–20%. The lead in the leaded zinc may vary between 20% to 80% depending upon the variety of leaded zinc oxide pigment desired. Deviations from this lead percentage have been shown to be impractical and ineffective in regards to leaded zinc oxide pigmentary characteristics. In order to illustrate more clearly the nature and characteristics of the invention the following examples are presented:

*Example I*

1,150 grams of SiO$_2$, 678 grams of commercially available ZnO, and 4,000 ml. of water were placed into a 4 gallon capacity ball mill. During a total milling of 18–20 hours 3 grams of acetic acid was added. The slurry was then filtered and dried at 105° C. When dry the solid material was placed into a muffle furnace and calcined at 565° C. for two hours.

Laboratory analysis and paint film tests showed the following:

| | |
|---|---|
| Percent ZnO | 36.0. |
| Percent $SiO_2$ | 62.3. |
| pH | 7.6. |
| Tinting strength | 80. |
| Oil absorption | 16.2 g. oil/100 g. pigment. |
| Specific gravity | 3.2 |
| Soap formation | Very good. |
| Coating | Good. |

*Example II*

1,150 grams of unground silica was ball milled with 750 ml. of filtered water for 18 to 20 hours in a one gallon capacity ball mill. The ground silica was transferred from the ball mill to the reaction tank while preparing the 322 grams of PbO and 672 grams of ZnO. The lead oxide and zinc oxide were blended, rendered into a slurry with water and added into the reaction tank through a 100 mesh screen. The amount of water including that of grinding of the silica, preparation of the slurry and washing through the sieve was 2,250 ml. At this time 3 grams of acetic acid were added, the slurry was brought up to 50°–60° C. and kept at this temperature until the reaction was complete. 66° Bé. sulfuric acid diluted with water in the ratio of 1:2 was added to the slurry at the rate of 15 drops per minute. The total amount of sulfuric acid added, measured as grams of $SO_3$, was 53 grams. As the slurry thickened when about three quarters of the acid was added, more water was added so that the total amount of water added was approximately 4,000 ml. After all the acid was added, the stirring continued for at least an hour to insure complete reaction. This also allowed the system to come to an equilibrium before the final pH value was determined. The slurry was filtered, dried, calcined for two hours at 565° C., cooled at room temperature and passed through the Raymond mill. Analysis and paint film tests of the above prepared pigment showed the following:

| | |
|---|---|
| Percent ZnO | 30.7. |
| Percent PbO | 13.8. |
| Percent $SiO_2$ | 52.3. |
| Percent $SO_3$ | 2.3. |
| pH | 7.3. |
| Tinting strength | 100. |
| Oil absorption | 22.2 g. oil/100 g. pigment. |
| Specific gravity | 3.3. |
| Soap formation | Very good. |
| Coating | Good. |

A similar system employing 1,150 grams of $SiO_2$, 770 grams PbO, 224 grams of ZnO and 125 grams $SO_3$ resulted in a pigment exhibiting properties similar to those given in the above table.

As the examples show the proportions of the ingredients, used in the practice of this invention, may be varied over a considerable range and still be considered to fall within its scope. To test the paintmaking properties of the composite pigments prepared above, paints were made by mixing the pigments with linseed oil, drier and volatile thinner at a pigment volume ratio of 32. The paints were subsequently applied to test panels and exposed to atmospheric conditions. The paints were compared to similar panels using the same pigment volume ratio of zinc oxide paints, leaded zinc oxide paints, lead sulfate-lead silicate type paints as given above. After 18 months' exposure of the panels it was shown that the experimental pigments were the equivalent of or better than the standard pigments used in respect to the following properties:

General appearance
Dirt collection
Chalk resistance
Checking
Cracking
Sealing
Mildew resistance
Overall durability The novel pigments of this invention have a tendency to exhibit a lower specific gravity than that which one would normally expect. This low specific gravity, probably due to the high proportion of silica which has a low specific gravity, is obviously a useful factor in certain applications where light weight pigments are desirable and may be further advantageous when considering pigments on a volume basis as, for example when formulating by the gallon. The method for making these pigments is simple and economical and in addition to their other advantages these pigments may be manufactured and sold more cheaply than pigments of comparable properties that have heretofore been available to the art.

While this invention has been described with reference to certain specific embodiments and by way of certain specific examples, these are illustrative only, and the invention is not to be construed as limited, except as set forth in the appended claims.

I claim:

1. A cocalcined zinc-oxide-silica pigment consisting essentially of ZnO and $SiO_2$, said pigment characterized by the absence of zinc silicate wherein said ZnO and $SiO_2$ are present in proportions by weight between about 20%–80% and 80%–20% based on the combined weight of said zinc oxide and said silica.

2. A cocalcined zinc oxide-lead sulfate silica pigment consisting essentially of zinc oxide, silica, and lead sulfate, said pigment characterized by the absence of zinc silicate wherein said ZnO and $SiO_2$ are present in proportions by weight between about 20%–80% and 80%–20% based on the combined weight of said zinc oxide and said silica, and said lead, calculated as PbO, of said lead sulfate is present in proportion by weight of about 20% to 80%, based on the combined weight of said lead oxide and said zinc oxide.

3. A pigment consisting essentially of $SiO_2$ coated with ZnO, said pigment characterized by the absence of zinc silicate wherein ZnO and $SiO_2$ are present in proportions by weight between about 20%–80% and 80%–20% based on the combined weight of said ZnO and said $SiO_2$.

4. A pigment consisting essentially of $SiO_2$ coated with lead sulfate and ZnO, said pigment characterized by the absence of zinc silicate, said $SiO_2$ in proportion by weight of about 20% to about 80% based on the combined weight of said $SiO_2$, said lead sulfate calculated as PbO and said ZnO, in which said lead calculated as PbO of said lead sulfate and said ZnO are in the proportion by weight between about 20%–80% and 80%–20% based on the combined weight of said lead oxide and said ZnO.

References Cited in the file of this patent

UNITED STATES PATENTS

| | | |
|---|---|---|
| 1,216,981 | Gardner | Feb. 20, 1917 |
| 2,176,875 | Alessandroni | Oct. 24, 1939 |
| 2,197,605 | Barton | Apr. 16, 1940 |
| 2,357,721 | Allan | Sept. 5, 1944 |
| 2,477,277 | Williams et al. | July 26, 1949 |

OTHER REFERENCES

Williams et al.: Industrial and Engineering Chemistry, October 1948, pages 1948–1950.